United States Patent
Neate

(10) Patent No.: US 12,255,886 B2
(45) Date of Patent: Mar. 18, 2025

(54) CONFIGURATION OF MULTIPLE SECRETS

(71) Applicant: MICROSOFT TECHNOLOGY LICENSING, LLC, Redmond, WA (US)

(72) Inventor: Nicolas Harry Neate, Reading (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 315 days.

(21) Appl. No.: 17/849,583

(22) Filed: Jun. 24, 2022

(65) Prior Publication Data

US 2023/0421550 A1    Dec. 28, 2023

(51) Int. Cl.
*H04L 9/40*    (2022.01)

(52) U.S. Cl.
CPC ........ *H04L 63/083* (2013.01); *H04L 63/0435* (2013.01); *H04L 63/062* (2013.01); *H04L 63/0823* (2013.01)

(58) Field of Classification Search
None
See application file for complete search history.

(56) References Cited

U.S. PATENT DOCUMENTS

| | | | | |
|---|---|---|---|---|
| 9,071,618 | B1* | 6/2015 | Pruthi | H04L 63/105 |
| 9,521,127 | B1* | 12/2016 | Childress | G06F 21/46 |
| 2011/0239278 | A1* | 9/2011 | Downey | H04L 63/083 |
| | | | | 726/4 |
| 2013/0326221 | A1* | 12/2013 | Murphy | H04L 51/18 |
| | | | | 713/168 |
| 2014/0165167 | A1 | 6/2014 | Nunn et al. | |
| 2015/0248548 | A1 | 9/2015 | Alshinnawi et al. | |
| 2022/0174061 | A1* | 6/2022 | Chitkara | H04L 9/3228 |
| 2022/0239699 | A1* | 7/2022 | Rothschild | H04L 67/148 |

OTHER PUBLICATIONS

"International Search Report and Written Opinion Issued in PCT Application No. PCT/US23/021864", Mailed Date: Jul. 26, 2023, 11 Pages.

* cited by examiner

*Primary Examiner* — Scott B Christensen

(74) *Attorney, Agent, or Firm* — Han Gim; Newport IP, LLC

(57) ABSTRACT

Techniques are described for managing secrets for accessing resources of a computing service provider by a client computing device. Two secrets are created that are valid for accessing the resource by the client computing device. When one of the two secrets are invalid for accessing the resource, the client computing device can use the second of the two secrets to gain access to the resource.

20 Claims, 12 Drawing Sheets

CONFIGURATION OF MULTIPLE SECRETS

BACKGROUND

A service can provide computing services to businesses and individuals as a remote computing service or provide "software as a service" (e.g., cloud computing). Many resources provided by the service provider require the use of a secret (e.g., password) to enable customers to access certain services. Mishaps with the use of secrets may prevent some customers from accessing the resources, which in turn can prevent the customer from providing services to their downstream users. Such issues may be exacerbated when service interruptions arise, and the service provider is unable to quickly isolate and correct the cause of a secrets misconfiguration issue. This can lead to lost revenue and customer dissatisfaction.

It is with respect to these considerations and others that the disclosure made herein is presented.

SUMMARY

It is common practice to configure servers with redundant secrets (keys, passwords, etc.) so that the secret currently in use can be rotated without a service outage. However, outages can still occur due to mistakes that can happen during secret rotation, for example if a secret being used by active, valid clients is revoked.

The disclosed embodiments describe technologies for configuring multiple secrets for a given service on the client in addition to the server. Thus, two or more secrets for a given service will be configured on the client at any one time, so that if the currently active secret is revoked at the server, the client can immediately fall back to using another configured secret, thus avoiding a service outage.

The described techniques can allow for a service provider or customer to more efficiently deploy and access computing resources while maintaining efficient use of computing capacity such as processor cycles, memory, network bandwidth, and power. In addition, the described techniques enable service providers to efficiently provide for the secure storage, retrieval, and rotation of secrets.

This Summary is provided to introduce a selection of concepts in a simplified form that are further described below in the Detailed Description. This Summary is not intended to limit the scope of the claimed subject matter.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
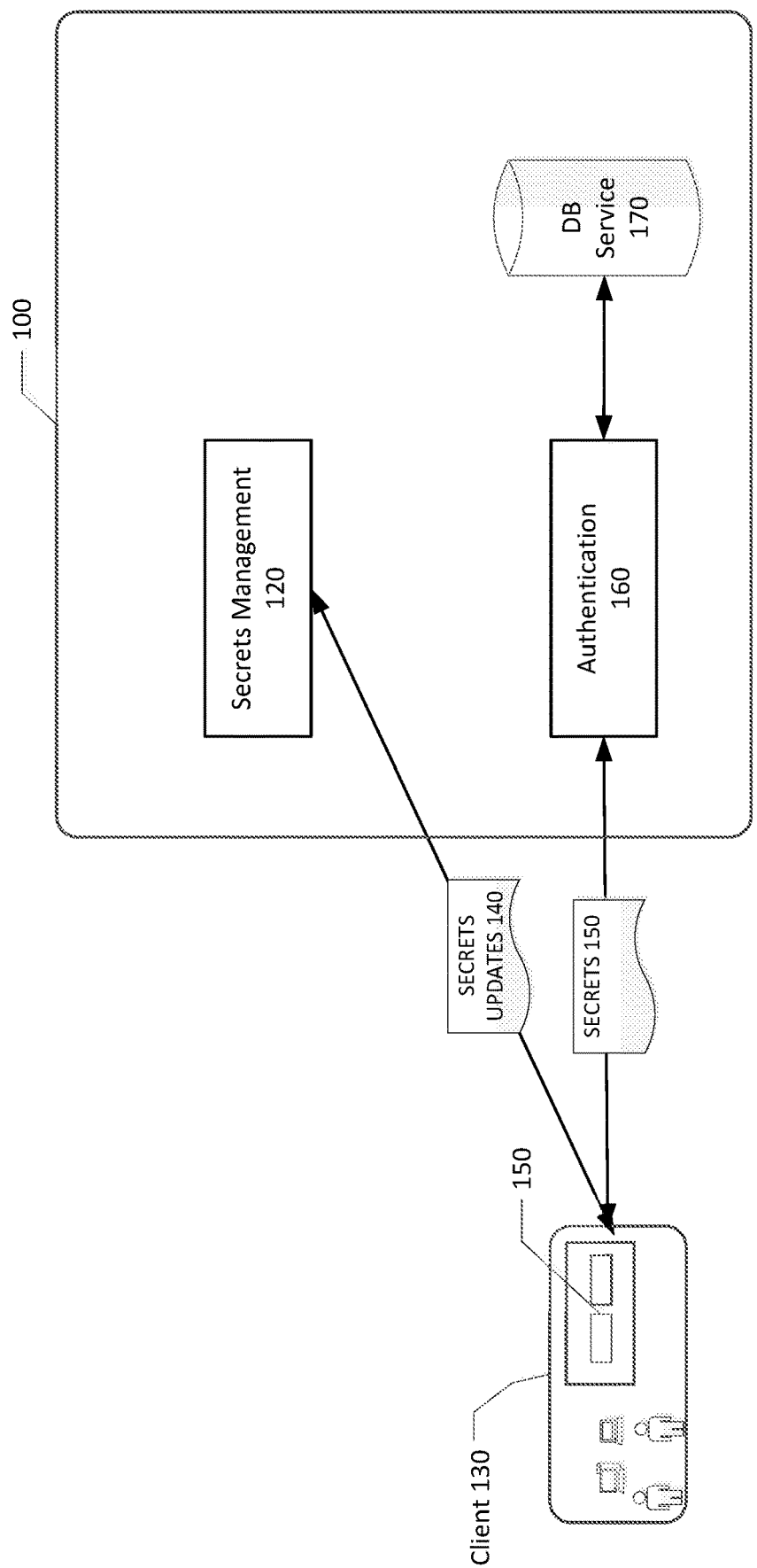
FIG. 1 is a diagram illustrating an example architecture in accordance with the present disclosure.

As used herein, secrets may be defined as data which allows for authentication between systems, components (e.g., a database), or as data that may be used in the encryption of other data. Secrets may be defined broadly as including, for example:

passwords

SSH keys (both public and private)

certificates and the key that was used to sign them

Many systems use secrets to enable clients to access data and services provided by a service, such as communications services. Secrets should be protected from misuse, and many systems use rotation to mitigate the risk of attack. Secrets rotation may involve maintaining two or more values of a valid secret at any given time. Many services also require high availability. It is therefore important that the rotation of secrets is performed seamlessly to avoid any loss of services due to invalid secrets.

Although servers at the service provider may maintain multiple secrets, clients normally are configured with only one secret at a time. While such an arrangement may work well for some period of time, an outage can occur relatively easily, for example due to the secret rotation process being performed incorrectly. As a result, the current password configured in the client may become invalid. When this occurs, the client will not be able to connect to the desired services, resulting in downtime and/or loss of data.

An administrator at the service provider may inadvertently revoke a password that is currently in use because the processes for revoking a password can be performed with relatively few actions. For example, regenerating an active database password may only require one or two actions on a portal. If the active database password is accidentally regenerated, during secret rotation or at any other time, then all customers that are configured with the revoked secret may lose access to the associated services. In many cases, once revoked, the same secret cannot be re-enabled for the service. Although a new valid secret can be generated, there will be some period of time during which the client will be unable to access services until the new secret is generated and configured on the client, resulting in a delay of potentially hours.

The disclosed embodiments describe technologies for configuring multiple secrets on the client as well as the server. Two or more secrets for a given service may be configured on the client at any one time, so that if an active secret is revoked on the server, the client can immediately fall back to using the other configured secret and thus avoid experiencing a service outage.

In an embodiment, the client may use both secrets on a regular basis to ensure that the secrets are functioning properly. If one secret stops functioning, the client can immediately switch to the second secret and inform the service provider that the first secret has stopped functioning. In some embodiments, the failed secret may be retried on a periodic basis. In one embodiment, the client may alternate between the two passwords for access requests. Alternatively, the client may choose a password at random. The client may send a notification if a password is rejected by the server.

In an embodiment, the client may allow for fast-path configuration updates for use in recovery of secret outages. The client may also support automated secret rotation to reduce the chances of accidental revocation.

In some embodiments, when a client switches to a second secret, the server at the service provider may initiate a recovery time period during which the various components and functions may be provided some time for transitioning to the second secret. Some components that are not configured to store or manage multiple secrets may be excluded from explicitly managing multiple secrets.

The disclosed embodiments may be implemented without impacting protocol exchanges. Underlying applications need not have control over the protocol flow to services that are being consumed or the authentication process on the service itself. The client may or may not include multiple secrets in a single protocol message.

In the steady state, the client may be configured with two valid secrets. In some embodiments, the client may be configured with more than two secrets.

The client may be configured to prevent a password from being removed from the client's configuration unless the client has at least one other password configured which is not under rejection. In this way, safe password rotation can be enabled across both the client and the server.

In an embodiment, the following example process illustrates the techniques disclosed herein. While the example process is shown with one client and two passwords, the described techniques can be extended to multiple clients and multiple passwords and other types of secrets.

Start: both client and server have passwords A and B configured. The client may use either passwords A or B to access a resource at the server or elsewhere at the service provider.

Replace A with A' at the server—the server may rotate passwords, and during the normal course of rotation, password A is updated to a new password A'. While the client has not yet updated password A with A', if the client attempts to use password A then the client's access will be rejected at the server. The client may issue an alarm or notification, or otherwise identify password A as invalid. The client may continue to use password B to access the resource. If the server inadvertently replaces B instead of A, the client may continue to use password A which is still valid.

Replace A with A' at the client—the client may update password A with A', and will now have both passwords A' and B as valid passwords. Before A has been replaced with A', the client may reject attempts to replace B for the period during which B is the only valid password configured in the client.

Replace B with B' at the server—the server may rotate passwords, and during the normal course of rotation, password B is updated to a new password B'. While the client has not yet updated password B with B', if the client attempts to use password B then the client's access will be rejected at the server. The client may issue an alarm or notification, or otherwise identify password B as invalid. The client may continue to use password A' to access the resource. If the server inadvertently replaces A' instead of B, the client may continue to use password B which is still valid.

Replace B with B' at the client—the client may update password B with B', and will now have both passwords A' and B' as valid passwords. Before B has been replaced with B', the client may reject attempts to replace A' for the period during which A' is the only valid password configured in the client.

End: both client and server have passwords A' and B' configured

In some embodiments, the present disclosure may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provide federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

Referring to the appended drawings, in which like numerals represent like elements throughout the several FIGURES, aspects of various technologies for remote management of computing resources will be described. In the following detailed description, references are made to the accompanying drawings that form a part hereof, and which are shown by way of illustration specific configurations or examples. While many examples are described using servers and disks, it should be understood that other types of compute nodes and storage devices may be used in other embodiments.

The management of secrets in the manner described may reduce the amount of reconfiguration that a user needs to manage, thus reducing effort and potential data loss or downtime. Additionally, the secrets management service may verify that all secrets for a given client have at least two valid secrets that are implemented for a given service before starting the deployment, thus allowing for continued operation in the event of a secrets mishap. This can allow for reduced effort and cost in debugging secrets issues, thus allowing for more efficient deployments and upgrades and an improved customer experience.

With reference to FIG. 1, a data center 100 of a service provider may provide a database service 170 to client 130. The data center 100 may also run a secrets management function 120 that provides secrets via secrets updates messages 140 to client 130. Client 130 may store the secrets 150 and use the secrets 150 to access the database service 170 after being authenticated by an authentication function 160 at data center 100.

Figure 2A:
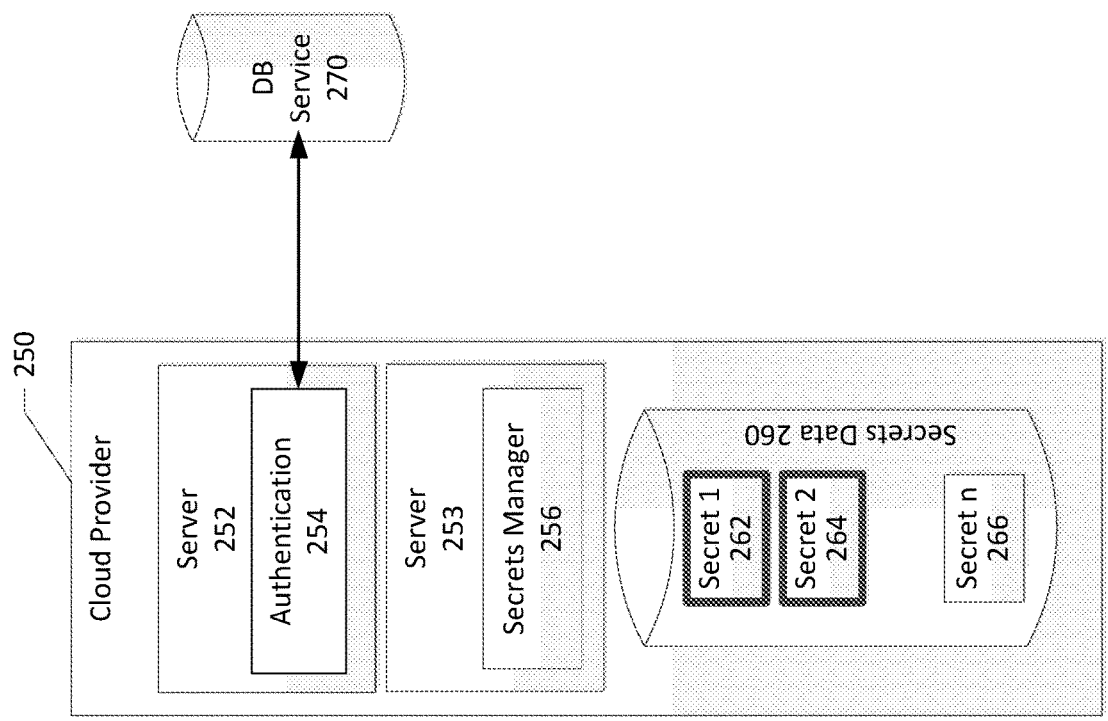
FIG. 2A is a diagram illustrating an example architecture in accordance with the present disclosure.
Figure 2A:
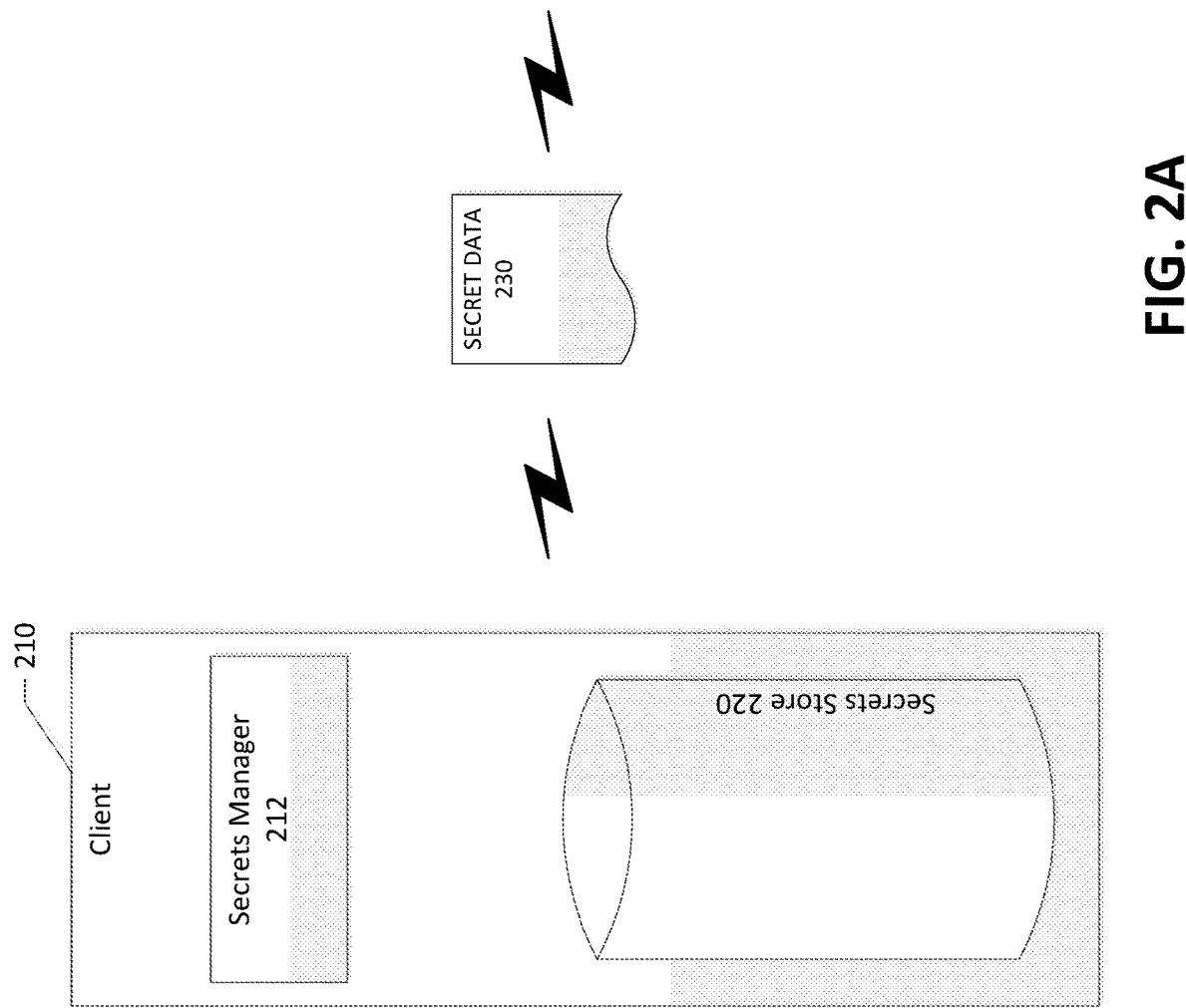

With reference to FIG. 2A, illustrated is one example architecture for a client 210 configured with multiple secrets. The client 210 may be a single device or a system comprising multiple devices. The client 210 may also be an edge site that may include one or more resources. The client 210 may include local secrets manager component 212, which may be a service running on the client 210 and configured to locally monitor secrets. The secrets manager component 212 may be configured to track various secrets data at the client 210 and communicate data related to secrets with cloud provider 250. Secrets manager component 212 may be configured to receive secrets data 230 for accessing services such as database service 270 at the cloud provider 250.

The client 210 may include secrets store 220, which may be configured to communicate with servers at cloud provider 250 and store secrets to connect to the servers. Cloud provider 250 may include a server 252 that runs an authentication function 254 that authenticates access requests to database service 270. Cloud provider 250 may also include a server 253 that runs a secrets manager 256 that is configured to manage secrets data 260 and a number of secrets currently in use such as secret 1 (262), secret 2 (264), and so on including secret n (266). In other embodiments, authentication function 254 and secrets manager 256 may run on the same server, or across distributed servers.

In one example, the secrets manager function 256 may select secret 1 (262) and secret 2 (264) to send as secret data 230 to client 210. Secret 1 (262) and secret 2 (264) may enable access to database service 270.

Figure 2B:
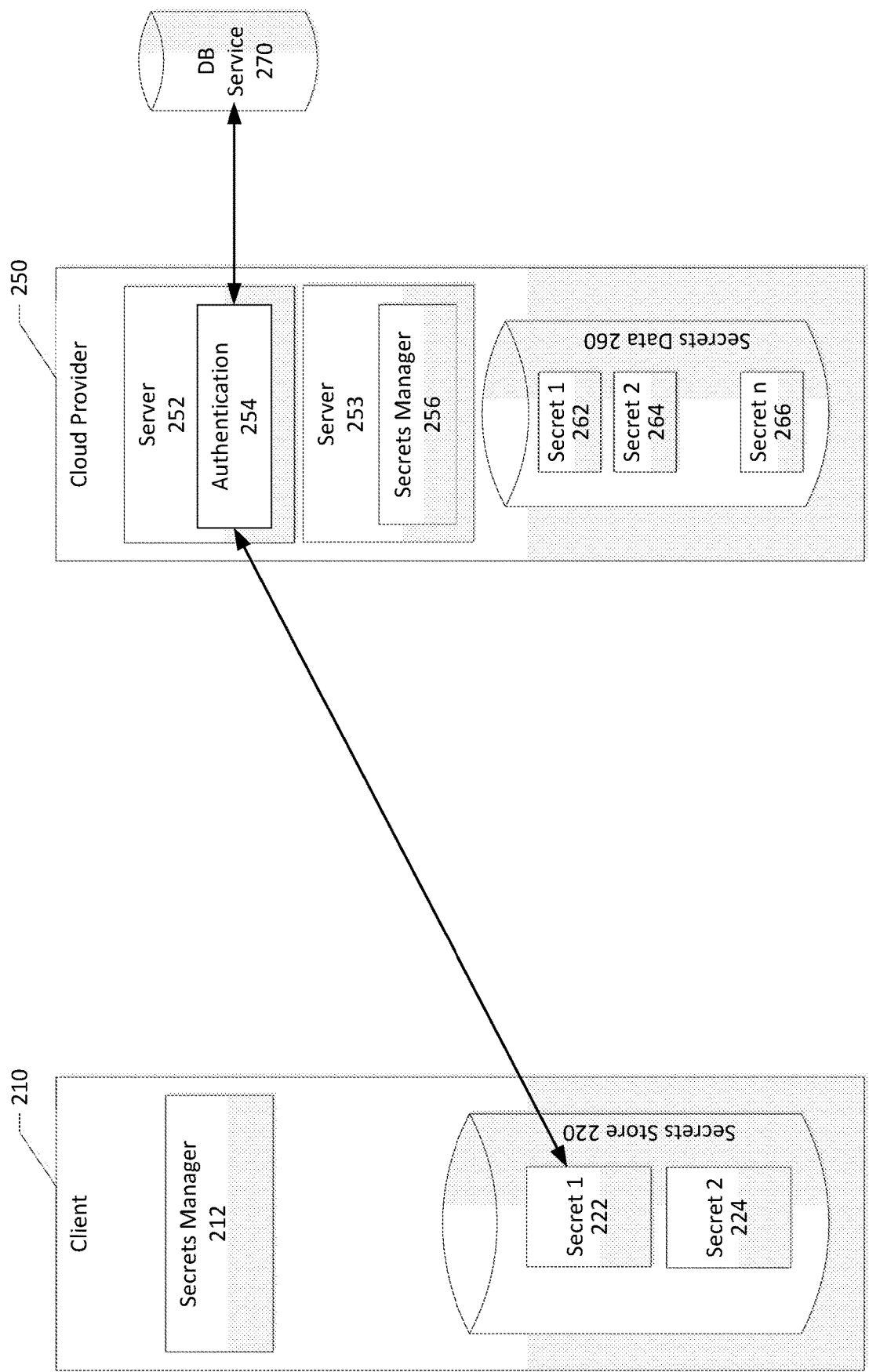
FIG. 2B is a diagram illustrating an example architecture in accordance with the present disclosure.

With reference to FIG. 2B, secrets manager component 212 at client 210 may store secret 1 (222) which corresponds to secret 1 (262) and secret 2 (224) which corresponds to secret 2 (264), in secrets store 220. Secret 1 (222) and secret 2 (224) may be used to access database service 270 after being authenticated by authentication component 254.

Figure 2C:
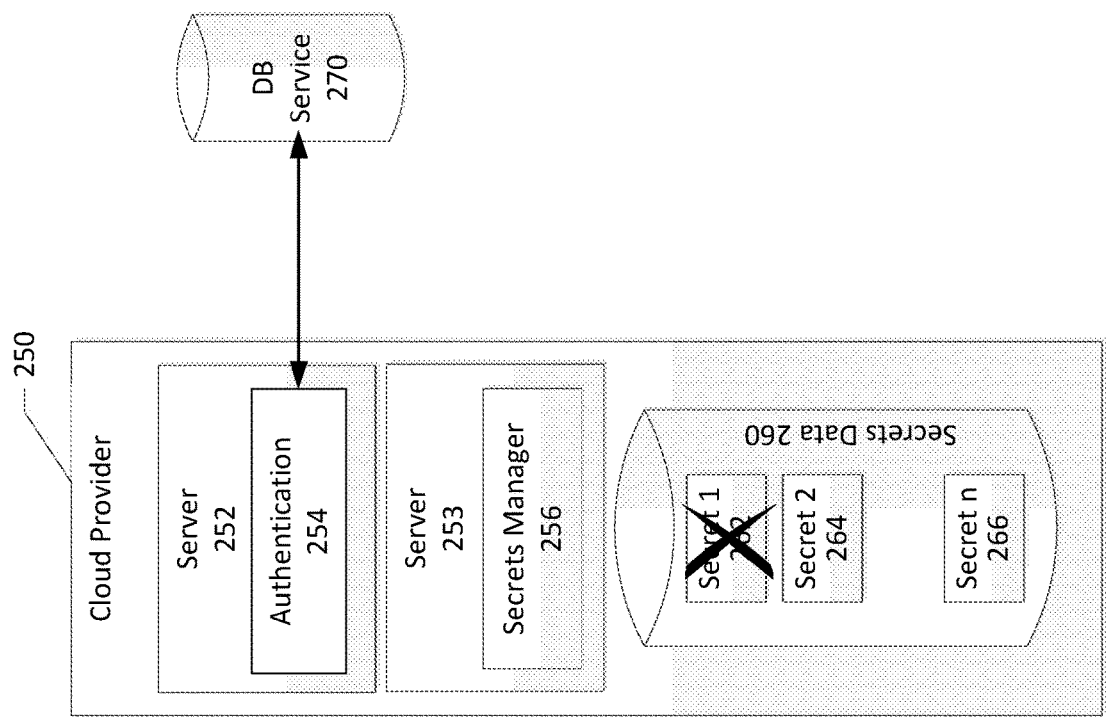
FIG. 2C is a diagram illustrating an example architecture in accordance with the present disclosure.
Figure 2D:
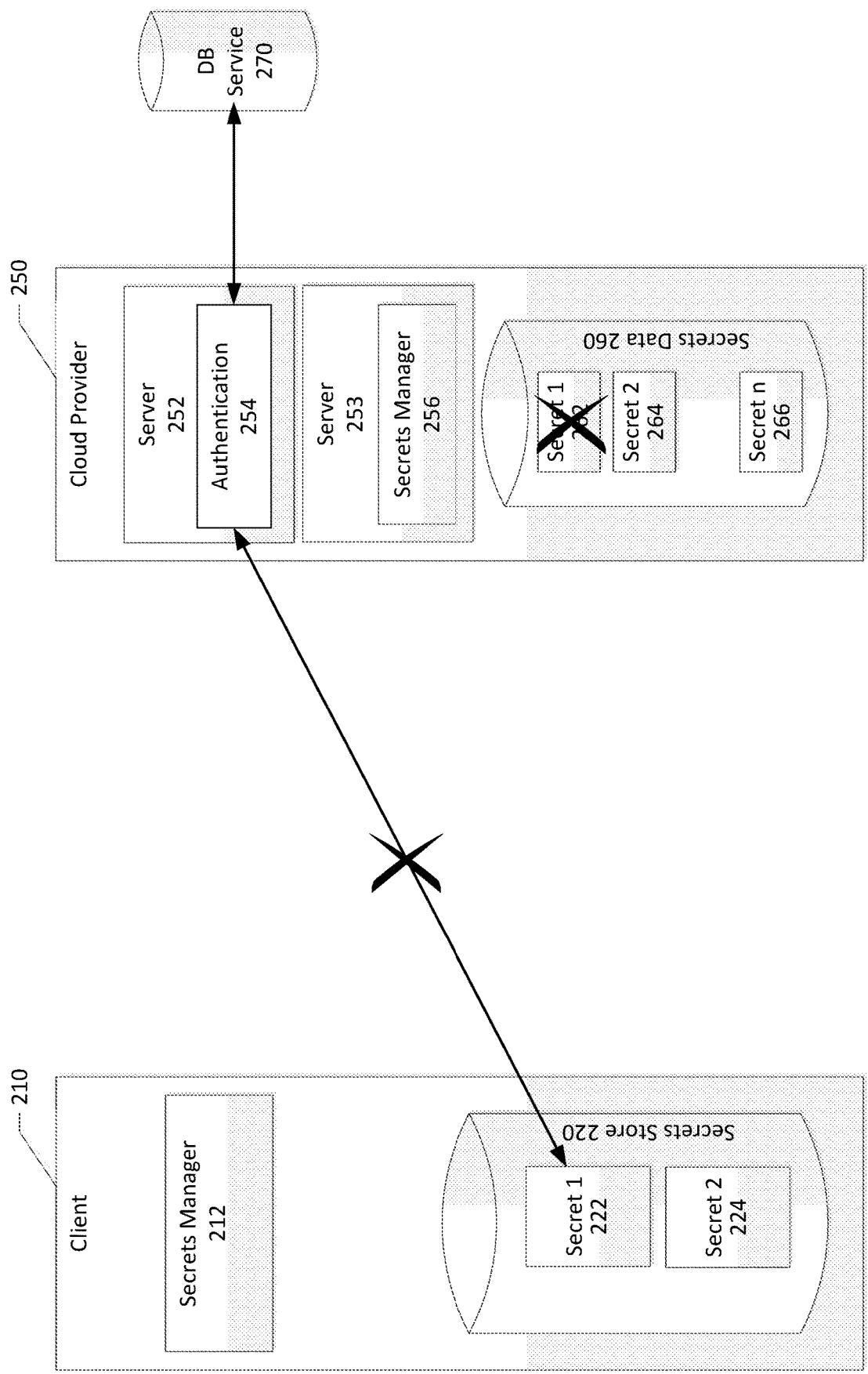
FIG. 2D is a diagram illustrating an example architecture in accordance with the present disclosure.

FIG. 2C illustrates one example scenario in which an administrator, via secrets manager component 212, may revoke secret 1 (262). FIG. 2D illustrates that client 210 may no longer access database service 270 due to being denied authentication by authentication component 254. At this stage, secret 1 (222) which corresponds to secret 1 (262) is no longer valid.

Figure 2E:
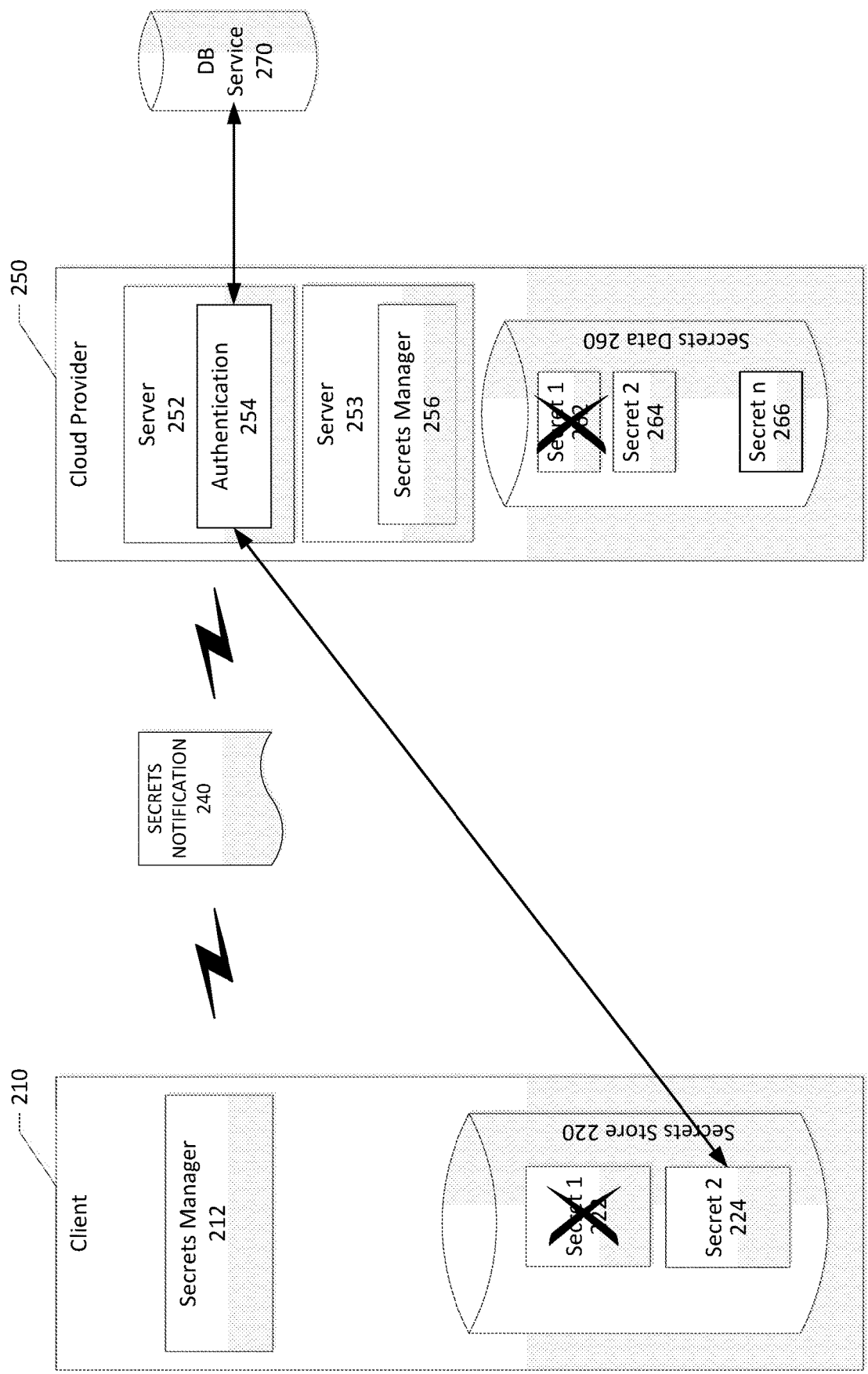
FIG. 2E is a diagram illustrating an example architecture in accordance with the present disclosure.

With reference to FIG. 2E, secrets manager component 212 at client 210 may send a secrets notification message 240 to cloud provider 250. The secrets notification message 240 may indicate that secret 1 (222) which corresponds to secret 1 (262) cannot be used to access database service 270 and is being denied by authentication component 254. Client 210 may use secret 2 (224) to access database service 270 after being authenticated by authentication component 254.

Figure 2F:
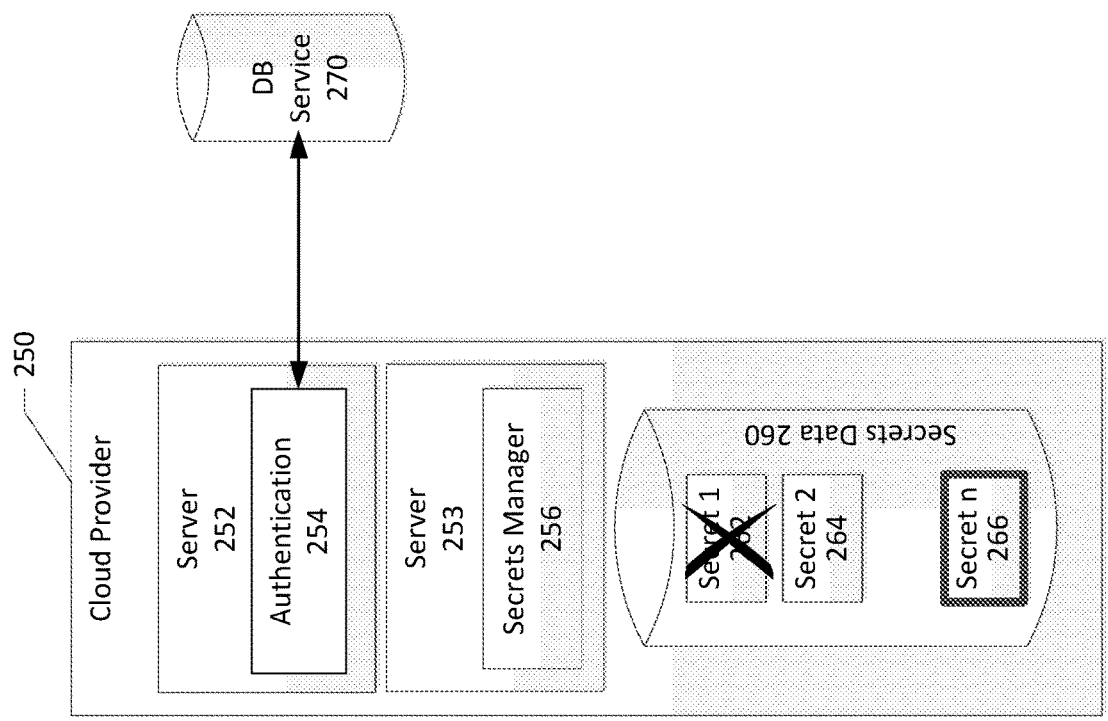
FIG. 2F is a diagram illustrating an example architecture in accordance with the present disclosure.
Figure 2F:
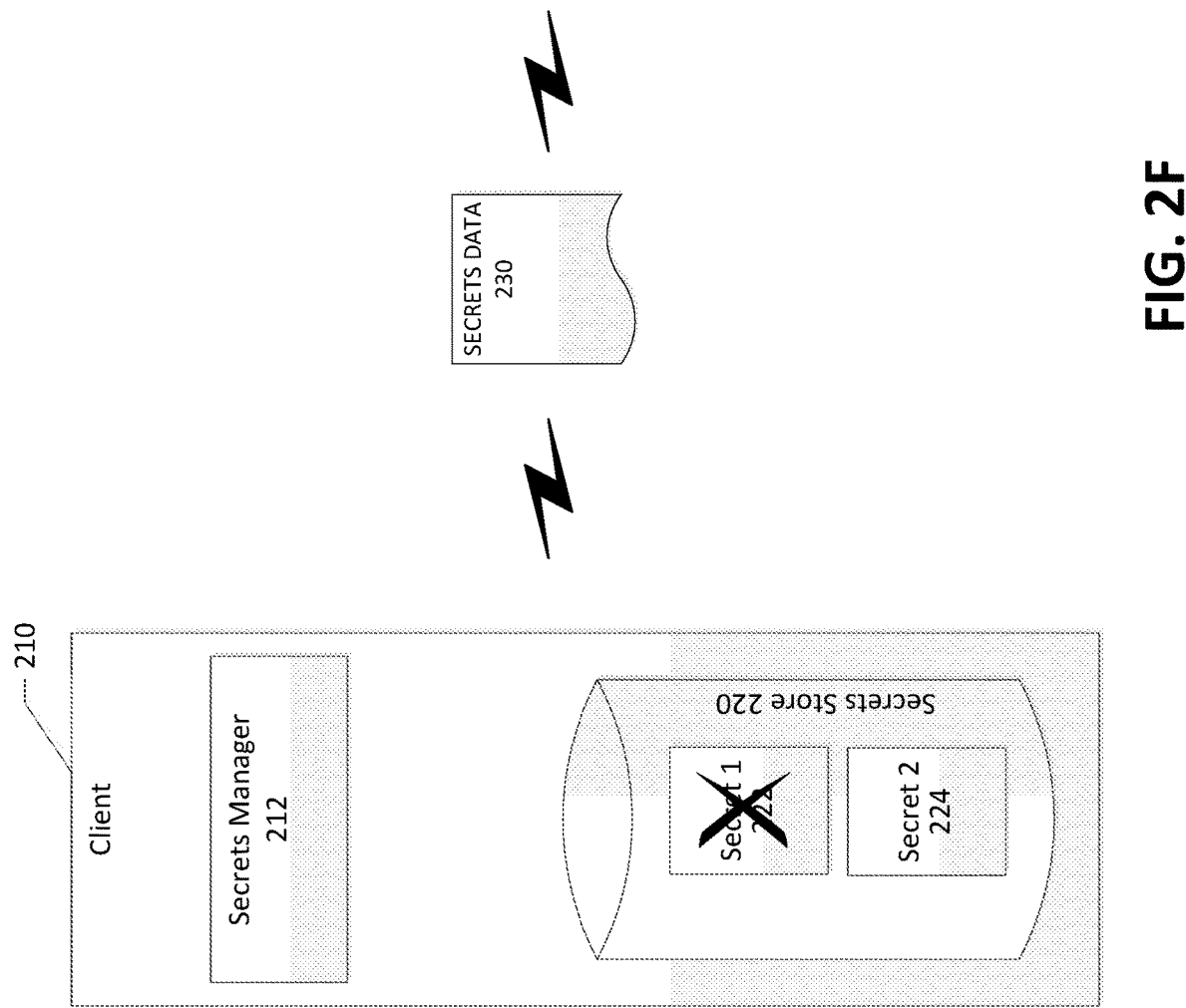
Figure 2G:
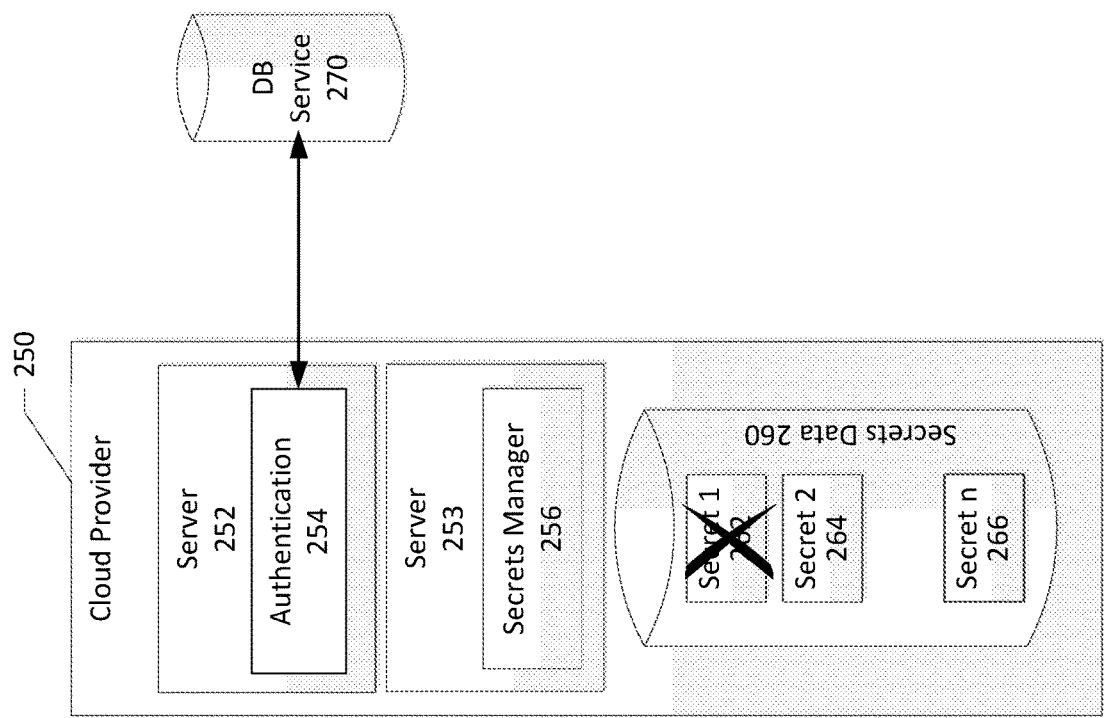
FIG. 2G is a diagram illustrating an example architecture in accordance with the present disclosure.
Figure 2G:
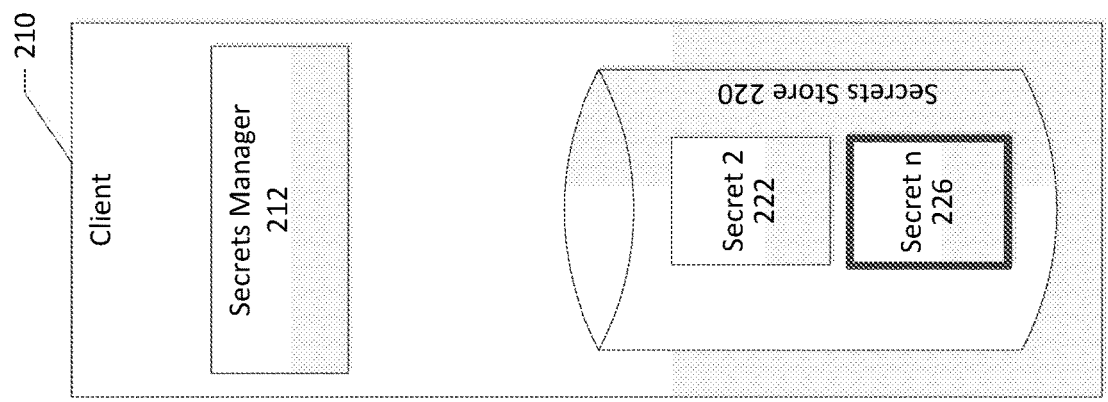
Figure 2H:
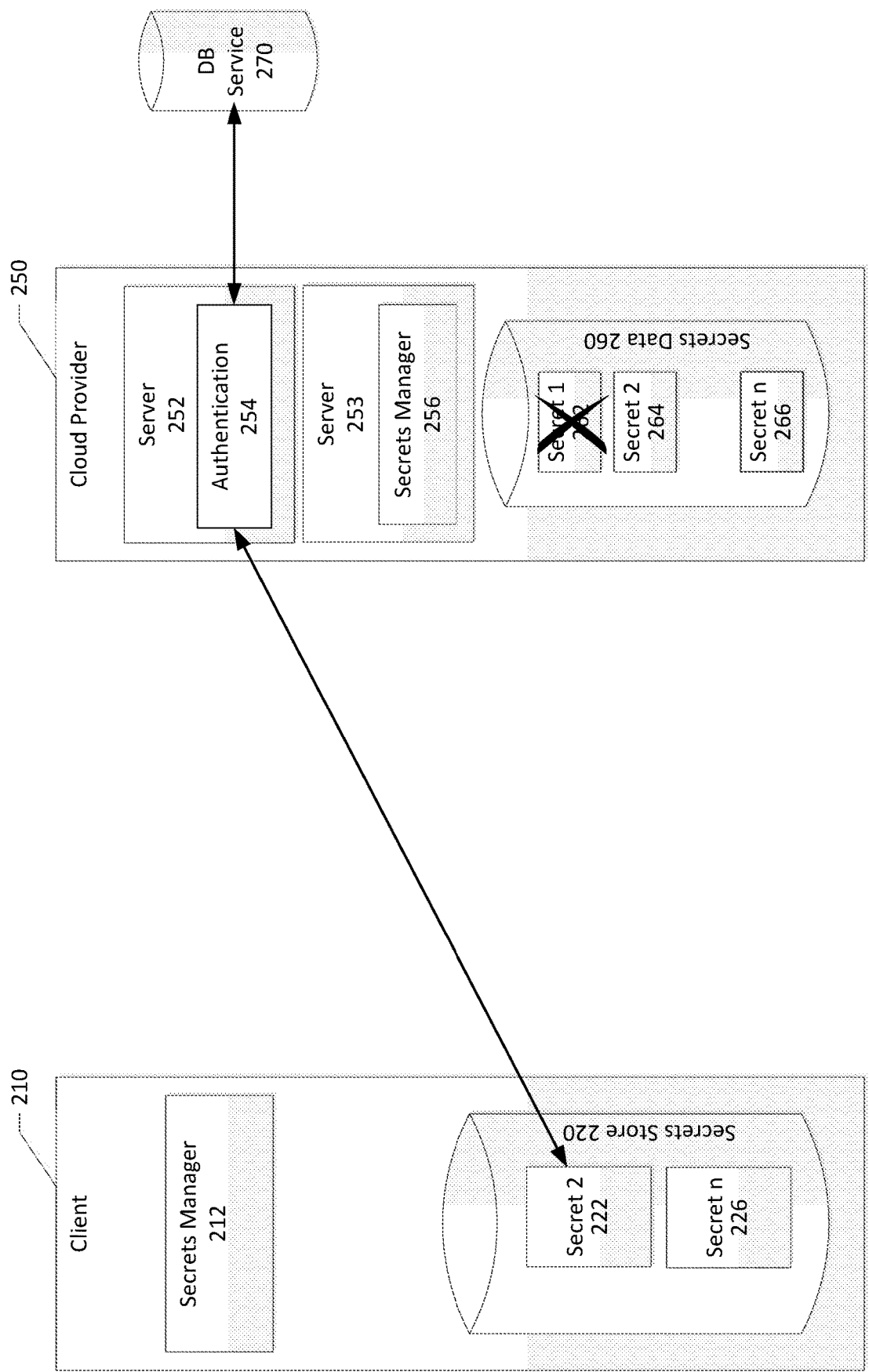
FIG. 2H is a diagram illustrating an example architecture in accordance with the present disclosure.

In one example, with reference to FIG. 2F, the secrets manager function 256 may select secret n (266) to send as secret data 230 to client 210. Secret n (266) may enable access to database service 270. With reference to FIG. 2G, secrets manager component 212 at client 210 may store secret n (226) which corresponds to secret n (266) in secrets store 220. With reference to FIG. 2H, secret n (226) may be used to access database service 270 after being authenticated by authentication component 254.

Figure 3:
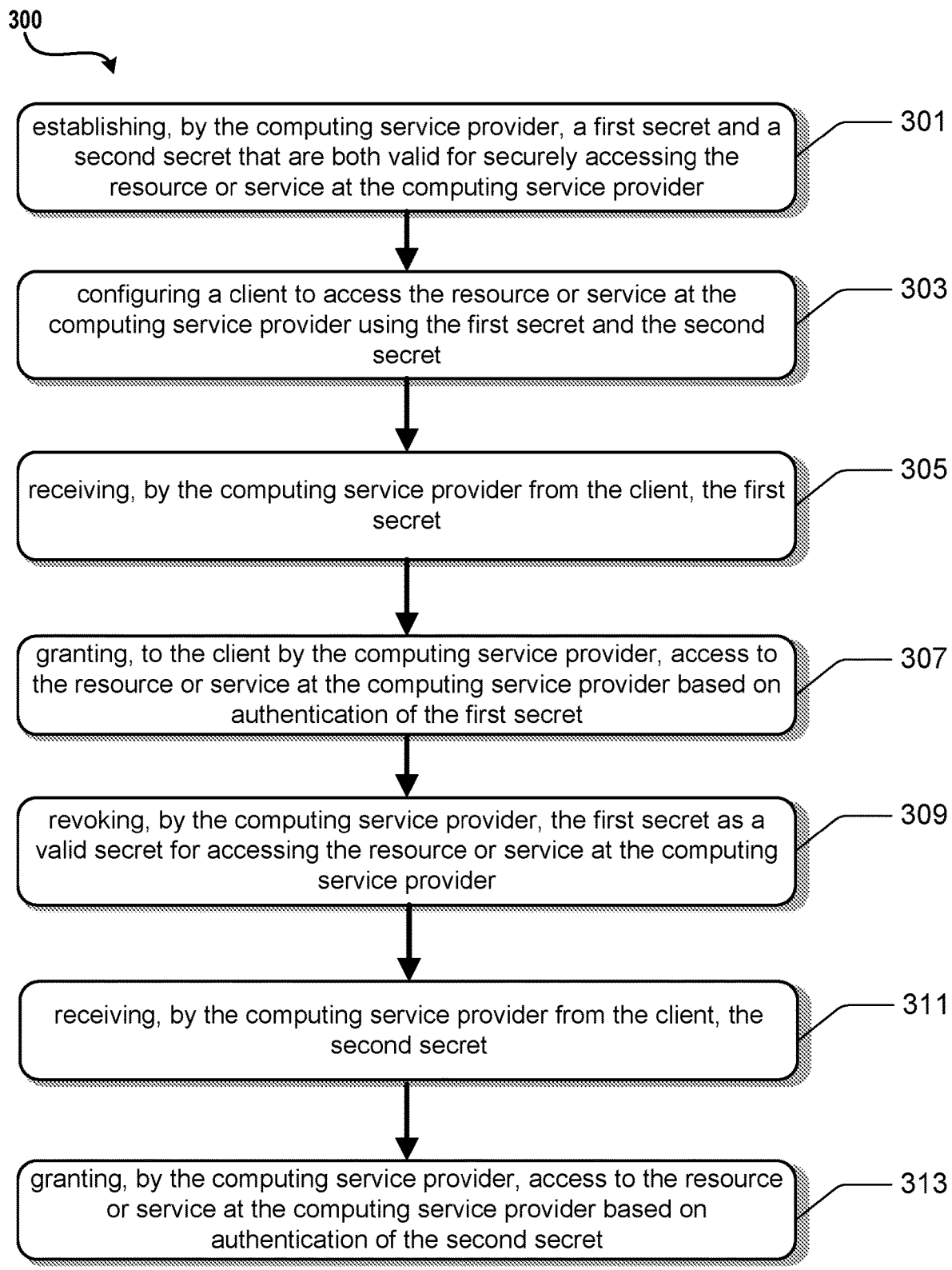
FIG. 3 is a flowchart depicting an example procedure for managing secrets in accordance with the present disclosure.

Turning now to FIG. 3, illustrated is an example operational procedure for managing secrets for accessing a secured resource or service of a computing service provider by a client. The client may be a client computing device or a client application running on a remote computing device or a computing device at the computing service provider, or any other computing device or function that is capable of accessing the secured resource or service of the computing service provider. In an embodiment, the operational procedure can be provided by one or more components illustrated in FIGS. 1 through 2H. The operational procedure may be implemented in a system comprising one or more computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 320 is described as running on a system, it can be appreciated that the routine 320 and other operations described herein can be executed on an individual computing device or several devices.

Referring to FIG. 3, operation 301 illustrates establishing, by the computing service provider, a first secret and a second secret that are both valid for securely accessing the resource or service at the computing service provider.

Operation 301 may be followed by operation 303. Operation 303 illustrates configuring a client to access the resource or service at the computing service provider using the first secret and the second secret. In an embodiment, either of the first secret and the second secret are usable by the client to access the resource or service at the computing service provider.

Operation 303 may be followed by operation 305. Operation 305 illustrates receiving, by the computing service provider from the client, the first secret.

Operation 305 may be followed by operation 307. Operation 307 illustrates granting, to the client by the computing service provider, access to the resource or service at the computing service provider based on authentication of the first secret.

Operation 307 may be followed by operation 309. Operation 309 illustrates revoking, by the computing service provider, the first secret as a valid secret for accessing the resource or service at the computing service provider.

Operation 309 may be followed by operation 311. Operation 311 illustrates receiving, by the computing service provider from the client, the second secret.

Operation 311 may be followed by operation 313. Operation 313 illustrates granting, by the computing service provider, access to the resource or service at the computing service provider based on authentication of the second secret.

Figure 4:
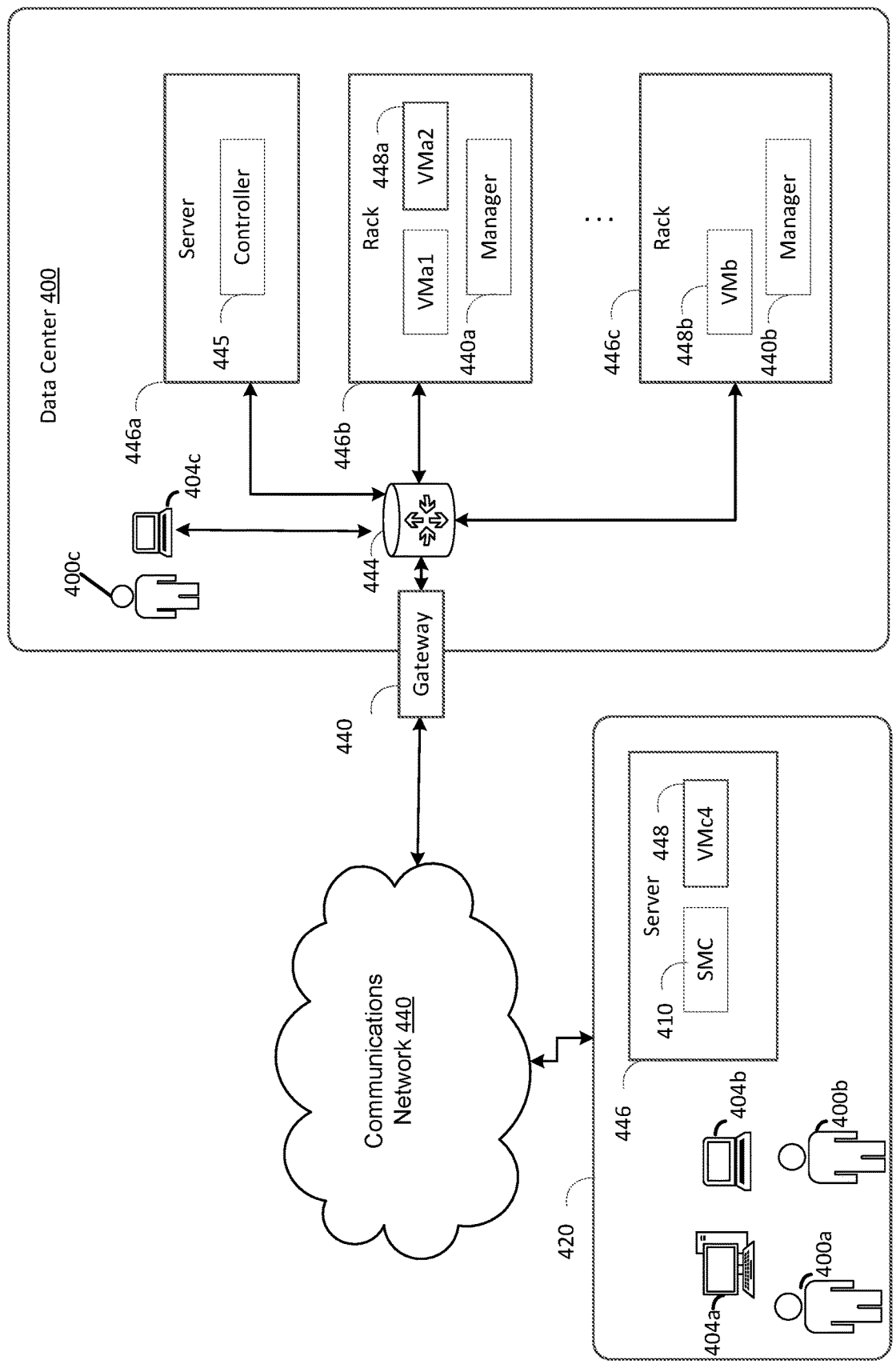
FIG. 4 is an example computing system in accordance with the present disclosure.

FIG. 4 illustrates an example computing environment in which the embodiments described herein may be implemented. FIG. 4 illustrates a data center 400 that is configured to provide computing resources to users 400*a*, 400*b*, or 400*c*

(which may be referred herein singularly as "a user 400" or in the plural as "the users 400") via user computers 404a, 404b, and 404c (which may be referred herein singularly as "a computer 404" or in the plural as "the computers 404") via a communications network 440. The computing resources provided by the data center 400 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 400 may correspond to data center 100 and 110 of FIG. 2. Data center 400 may include servers 446a, 446b, and 446c (which may be referred to herein singularly as "a server 446" or in the plural as "the servers 446") that may be standalone or installed in server racks, and provide computing resources available as virtual machines 448a and 448b (which may be referred to herein singularly as "a virtual machine 448" or in the plural as "the virtual machines 448"). The virtual machines 448 may be configured to execute applications such as Web servers, application servers, media servers, database servers, and the like. Other resources that may be provided include data storage resources (not shown on FIG. 4) and may include file storage devices, block storage devices, and the like. Servers 446 may also execute functions that manage and control allocation of resources in the data center, such as a controller 445. Controller 445 may be a fabric controller or another type of program configured to manage the allocation of virtual machines on servers 446.

Referring to FIG. 4, communications network 440 may, for example, be a publicly accessible network of linked networks and may be operated by various entities, such as the Internet. In other embodiments, communications network 440 may be a private network, such as a corporate network that is wholly or partially inaccessible to the public.

Communications network 440 may provide access to computers 404. Computers 404 may be computers utilized by users 400. Computer 404a, 404b or 404c may be a server, a desktop or laptop personal computer, a tablet computer, a smartphone, a set-top box, or any other computing device capable of accessing data center 400. User computer 404a or 404b may connect directly to the Internet (e.g., via a cable modem). User computer 404c may be internal to the data center 400 and may connect directly to the resources in the data center 400 via internal networks. Although only three user computers 404a, 404b, and 404c are depicted, it should be appreciated that there may be multiple user computers.

Computers 404 may also be utilized to configure aspects of the computing resources provided by data center 400. For example, data center 400 may provide a Web interface through which aspects of its operation may be configured through the use of a Web browser application program executing on user computer 404. Alternatively, a stand-alone application program executing on user computer 404 may be used to access an application programming interface (API) exposed by data center 400 for performing the configuration operations.

Servers 446 may be configured to provide the computing resources described above. One or more of the servers 446 may be configured to execute a manager 440a or 440b (which may be referred herein singularly as "a manager 440" or in the plural as "the managers 440") configured to execute the virtual machines. The managers 440 may be a virtual machine monitor (VMM), fabric controller, or another type of program configured to enable the execution of virtual machines 448 on servers 446, for example.

It should be appreciated that although the embodiments disclosed above are discussed in the context of virtual machines, other types of implementations can be utilized with the concepts and technologies disclosed herein.

In the example data center 400 shown in FIG. 4, a network device 444 may be utilized to interconnect the servers 446a and 446b. Network device 444 may comprise one or more switches, routers, or other network devices. Network device 444 may also be connected to gateway 440, which is connected to communications network 440. Network device 444 may facilitate communications within networks in data center 400, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 4 has been greatly simplified and that many more networks and networking devices may be utilized to interconnect the various computing systems disclosed herein. These network topologies and devices should be apparent to those skilled in the art.

It should also be appreciated that data center 400 described in FIG. 4 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

FIG. 4 illustrates an example deployment site 420, in accordance with the present disclosure. In one embodiment, one or more servers 436 may be installed at the edge site 420. In an embodiment, servers 436 instantiate and run virtual machines 438. In an embodiment, a secrets management component (SMC) 410 as described herein may be implemented in server 436.

In some embodiments, users 400 may specify configuration information for a virtual network to be provided for the user, with the configuration information optionally including a variety of types of information such as network addresses to be assigned to computing endpoints of the provided computer network, network topology information for the provided computer network, network access constraints for the provided computer network. The network addresses may include, for example, one or more ranges of network addresses, which may correspond to a subset of virtual or private network addresses used for the user's private computer network. The network topology information may indicate, for example, subsets of the computing endpoints to be grouped together, such as by specifying networking devices to be part of the provided computer network, or by otherwise indicating subnets of the provided computer network or other groupings of the provided computer network. The network access constraint information may indicate, for example, for each of the provided computer network's computing endpoints, which other computing endpoints may intercommunicate with the computing node endpoint, or the types of communications allowed to/from the computing endpoints.

The various aspects of the disclosure have been described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

Figure 5:
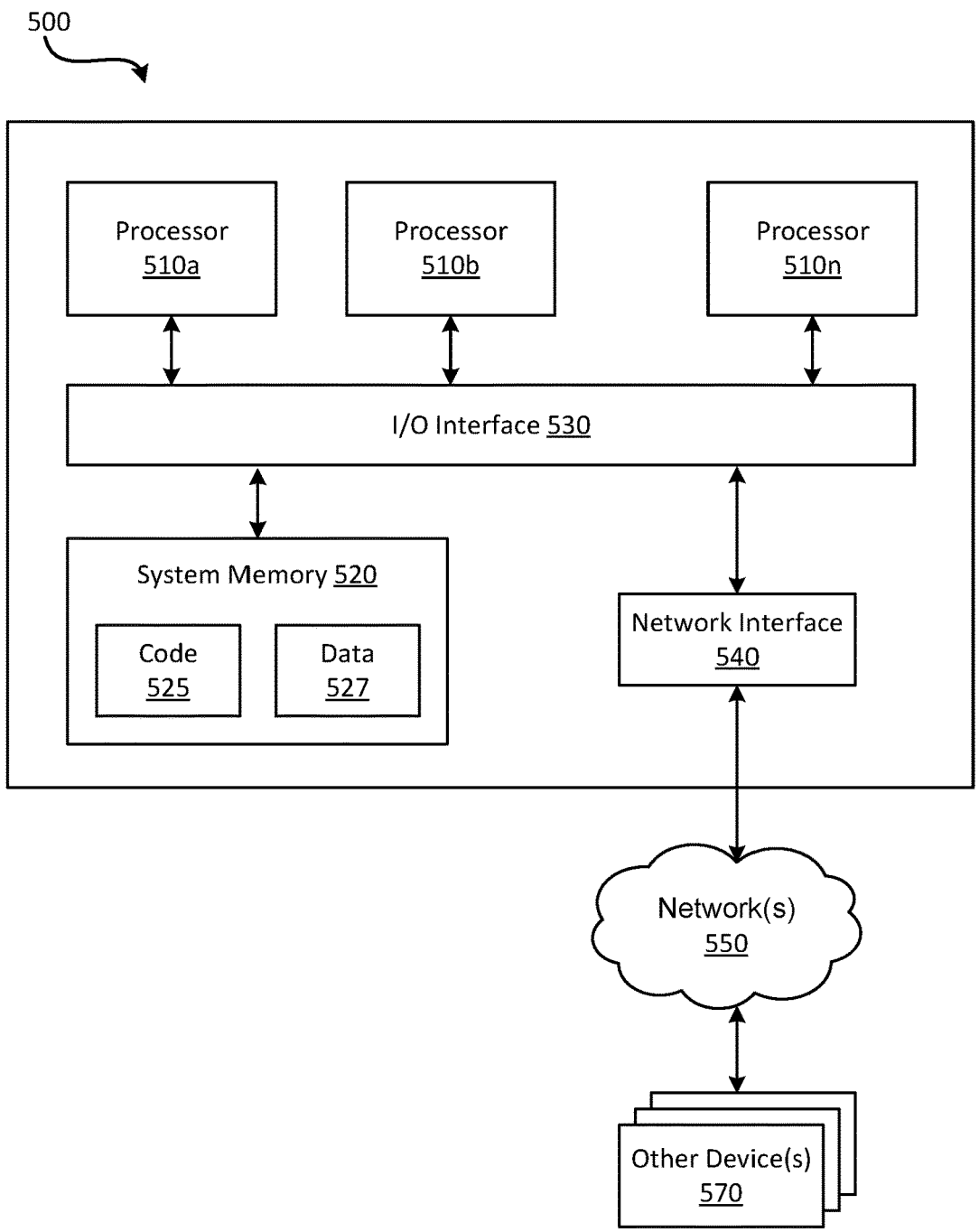
FIG. 5 is an example computing system in accordance with the present disclosure.

FIG. 5 illustrates a general-purpose computing device 500. In the illustrated embodiment, computing device 500 includes one or more processors 510a, 510b, and/or 510n (which may be referred herein singularly as "a processor 510" or in the plural as "the processors 510") coupled to a system memory 520 via an input/output (I/O) interface 530. Computing device 500 further includes a network interface 540 coupled to I/O interface 530.

In various embodiments, computing device 500 may be a uniprocessor system including one processor 510 or a multiprocessor system including several processors 510 (e.g., two, four, eight, or another suitable number). Processors 510 may be any suitable processors capable of executing instructions. For example, in various embodiments, processors 510 may be general-purpose or embedded processors implementing any of a variety of instruction set architectures (ISAs), such as the x55, PowerPC, SPARC, or MIPS ISAs, or any other suitable ISA. In multiprocessor systems, each of processors 510 may commonly, but not necessarily, implement the same ISA.

System memory 520 may be configured to store instructions and data accessible by processor(s) 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 520 as code 525 and data 525.

In one embodiment, I/O interface 530 may be configured to coordinate I/O traffic between the processor 510, system memory 520, and any peripheral devices in the device, including network interface 540 or other peripheral interfaces. In some embodiments, I/O interface 530 may perform any necessary protocol, timing, or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components. Also, in some embodiments some or all of the functionality of I/O interface 530, such as an interface to system memory 520, may be incorporated directly into processor 510.

Network interface 540 may be configured to allow data to be exchanged between computing device 500 and other device or devices 550 attached to a network or network(s) 550, such as other computer systems or devices as illustrated in FIGS. 1 through 5, for example. In various embodiments, network interface 540 may support communication via any suitable wired or wireless general data networks, such as types of Ethernet networks, for example. Additionally, network interface 540 may support communication via telecommunications/telephony networks such as analog voice networks or digital fiber communications networks, via storage area networks such as Fibre Channel SANs or via any other suitable type of network and/or protocol.

In some embodiments, system memory 520 may be one embodiment of a computer-accessible medium configured to store program instructions and data as described above for FIGS. 1-4 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 500 via I/O interface 530. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 500 as system memory 520 or another type of memory. Further, a computer-accessible medium may include transmission media or signals such as electrical, electromagnetic or digital signals, conveyed via a communication medium such as a network and/or a wireless link, such as may be implemented via network interface 540. Portions or all of multiple computing devices, such as those illustrated in FIG. 5, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 5, may include other components that are not explicitly shown in FIG. 5, or may utilize an architecture completely different than that shown in FIG. 5.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A
method of managing secrets for accessing a secured resource or service of a computing service provider by a client, the method comprising:
  establishing, by the computing service provider, a first secret and a second secret that are both valid for securely accessing the resource or service at the computing service provider;
  configuring a client to access the resource or service at the computing service provider using the first secret and the second secret, wherein either of the first secret and the second secret are usable by the client to access the resource or service at the computing service provider;
  receiving, by the computing service provider from the client, the first secret;
  granting, to the client by the computing service provider, access to the resource or service at the computing service provider based on authentication of the first secret;
  revoking, by the computing service provider, the first secret as a valid secret for accessing the resource or service at the computing service provider;
  receiving, by the computing service provider from the client, the second secret; and
  granting, by the computing service provider, access to the resource or service at the computing service provider based on authentication of the second secret.

Clause 2: The method of clause 1, further comprising:
  establishing, by the computing service provider, a third secret that is valid for accessing the resource or service at the computing service provider; and
  configuring the client to access the resource or service at the computing service provider using both the third secret and the second secret.

Clause 3: The method of any of clauses 1-2, further comprising:
  receiving, by the computing service provider from the client, a notification that the client was unable to access the resource or service at the computing service provider using the first secret.

Clause 4: The method of any of clauses 1-3, wherein the first and second secrets are one or more of passwords, SSH keys, or certificates.

Clause 5: The method of any of clauses 1-4, wherein the client rotates between at least two valid secrets for accessing the resource or service at the computing service provider.

Clause 6: The method of any of clauses 1-5, wherein the resource or service at the computing service provider is a database service.

Clause 7: The method of clauses 1-6, further comprising configuring the client to access the resource or service at the computing service provider using three or more secrets that are operable for accessing the resource or service at the computing service provider.

Clause 8: A system comprising:
  a memory storing thereon instructions that when executed by a processor of the system, cause the system to perform operations comprising:
    receiving, from a computing service provider, two secrets that are operable for accessing a resource at the computing service provider, wherein the resource at the computing service provider is accessible using either of the two secrets;
    accessing the resource at the computing service provider at a first time, based on authentication of the first of the two secrets;
    accessing the resource at the computing service provider at a second time, based on authentication of the second of the two secrets;
    in response to a request to access the resource at the computing service provider at a third time using the first of the two secrets, receiving, from the computing service provider, an indication that the first of the two secrets is not valid for accessing the resource at the computing service provider;
    sending, to the computing service provider, a notification that the resource at the computing service provider was not accessible using the first of the two secrets;
    receiving, from the computing service provider, a third secret that is operable to access the resource at the computing service provider; and
    accessing the resource at the computing service at a subsequent time, based on authentication of the third secret or the second secret.

Clause 9: The system of clause 8, wherein the secrets are one or more of passwords, SSH keys, or certificates.

Clause 10: The system of any of clauses 8 and 9, further comprising rotating between at least two valid secrets for accessing the resource at the computing service provider.

Clause 11: The system of any clauses 8-10, wherein the resource at the computing service provider is a database service.

Clause 12: The system of any clauses 8-11, further comprising instructions that when executed by a processor of the system, cause the system to perform operations comprising:
  accessing the resource at the computing service provider using three or more secrets that are operable for accessing the resource at the computing service provider.

Clause 13: The system of any clauses 8-12, further comprising instructions that when executed by a processor of the system, cause the system to perform operations comprising:
  accessing the resource at the computing service provider using all valid secrets on a regular basis to access the resource at the computing service provider.

Clause 14: The system of any clauses 8-13, wherein the valid secrets are alternated.

Clause 15: The system of any clauses 8-14, wherein the valid secrets are selected at random.

Clause 16: The system of any clauses 8-15, further comprising instructions that when executed by a processor of the system, cause the system to perform operations comprising:
  attempting to access the resource at the computing service provider using the first of the two secrets on a periodic basis.

Clause 17: A computer-readable storage medium having computer-executable instructions stored thereupon which, when executed by one or more processors of a computing device, cause the computing device to perform operations comprising:
  establishing two secrets that are valid for accessing a resource;

configuring a client computing device to access the resource using both of the two secrets;

receiving, from the client computing device, a first of the two secrets;

granting access to the resource based on authentication of the first of the two secrets;

revoking the first of the two secrets as valid for accessing the resource;

receiving, from the client computing device, a second of the two secrets; and granting access to the resource based on authentication of the second of the two secrets.

Clause 18: The computer-readable storage medium of clause 17, further comprising computer-executable instructions stored thereupon which, when executed by one or more processors of a computing device, cause the computing device to perform operations comprising:

establishing a third secret that is valid for accessing the resource; and configuring the client computing device to access the resource using both the third secret and the second of the two secrets.

Clause 19: The computer-readable storage medium of any of clauses 17 and 18, further comprising computer-executable instructions stored thereupon which, when executed by one or more processors of a computing device, cause the computing device to perform operations comprising:

receiving, from the client computing device, a notification that the client computing device was unable to access the resource using the first of the two secrets.

Clause 20: The computer-readable storage medium of any of the clauses 17-19, further comprising computer-executable instructions stored thereupon which, when executed by one or more processors of a computing device, cause the computing device to perform operations comprising:

configuring the client computing device to access the resource using three or more secrets that are operable for accessing the resource.

The invention claimed is:

1. A method of managing secrets for accessing a secured resource or service of a computing service provider by a client, the method comprising:

establishing, by the computing service provider, a first secret and a second secret that are both valid for securely accessing the resource or service at the computing service provider;

configuring a client to access the resource or service at the computing service provider using a set of valid secrets including the first secret and the second secret, wherein either of the first secret and the second secret are usable by the client to access the resource or service at the computing service provider and at least two secrets are maintained in the set of valid secrets;

receiving, by the computing service provider from the client, the first secret;

granting, to the client by the computing service provider, access to the resource or service at the computing service provider based on authentication of the first secret;

revoking, by the computing service provider, the first secret as a valid secret for accessing the resource or service at the computing service provider, while continuing to maintain at least two secrets in the set of valid secrets;

receiving, by the computing service provider from the client, the second secret; and granting, by the computing service provider, access to the resource or service at the computing service provider based on authentication of the second secret;

wherein:

the computing service provider is configured to grant, for the resource or service at the computing service provider, access to the resource or service responsive to receiving any arbitrary secret included in the set of valid secrets; and each of the secrets included in the set of valid secrets are secrets of a same type for providing a single entity with a same access to the resource or service at the computing service provider.

2. The method of claim 1, further comprising:

establishing, by the computing service provider, a third secret that is valid for accessing the resource or service at the computing service provider; and configuring the client to access the resource or service at the computing service provider using both the third secret and the second secret.

3. The method of claim 1, further comprising:

receiving, by the computing service provider from the client, a notification that the client was unable to access the resource or service at the computing service provider using the first secret.

4. The method of claim 1, wherein the first and second secrets are one or more of passwords, SSH keys, or certificates.

5. The method of claim 1, wherein the client rotates between at least two valid secrets for accessing the resource or service at the computing service provider.

6. The method of claim 1, wherein the resource or service at the computing service provider is a database service.

7. The method of claim 1, further comprising configuring the client to access the resource or service at the computing service provider using three or more secrets that are operable for accessing the resource or service at the computing service provider.

8. A system comprising:

a memory storing thereon instructions that when executed by a processor of the system, cause the system to perform operations comprising:

receiving, from a computing service provider, two secrets that are operable for accessing a resource at the computing service provider, wherein the resource at the computing service provider is accessible using a set of valid secrets including the two secrets and wherein at least two secrets are maintained in the set of valid secrets;

accessing the resource at the computing service provider at a first time, based on authentication of the first of the two secrets;

accessing the resource at the computing service provider at a second time, based on authentication of the second of the two secrets;

in response to a request to access the resource at the computing service provider at a third time using the first of the two secrets, receiving, from the computing service provider, an indication that the first of the two secrets is not valid for accessing the resource at the computing service provider;

sending, to the computing service provider, a notification that the resource at the computing service provider was not accessible using the first of the two secrets;

receiving, from the computing service provider, a third secret that is operable to access the resource at the computing service provider;

adding additional secrets to maintain at least two secrets in the set of valid secrets; and accessing the resource at the computing service at a subsequent time, based on authentication of the third secret or the second secret;

wherein:

the computing service provider is configured to grant, for the resource at the computing service provider, access to the resource responsive to receiving any arbitrary secret included in the set of valid secrets; and each of the secrets included in the set of valid secrets are secrets of a same type for providing a single entity with a same access to the resource at the computing service provider.

9. The system of claim 8, wherein the secrets are one or more of passwords, SSH keys, or certificates.

10. The system of claim 8, further comprising rotating between at least two valid secrets for accessing the resource at the computing service provider.

11. The system of claim 8, wherein the resource at the computing service provider is a database service.

12. The system of claim 8, further comprising instructions that when executed by a processor of the system, cause the system to perform operations comprising:

accessing the resource at the computing service provider using three or more secrets that are operable for accessing the resource at the computing service provider.

13. The system of claim 8, further comprising instructions that when executed by a processor of the system, cause the system to perform operations comprising:

accessing the resource at the computing service provider using all valid secrets on a regular basis to access the resource at the computing service provider.

14. The system of claim 13, wherein the valid secrets are alternated.

15. The system of claim 13, wherein the valid secrets are selected at random.

16. The system of claim 8, further comprising instructions that when executed by a processor of the system, cause the system to perform operations comprising:

attempting to access the resource at the computing service provider using the first of the two secrets on a periodic basis.

17. A computer-readable storage medium having computer-executable instructions stored thereupon which, when executed by one or more processors of a computing device, cause the computing device to perform operations comprising:

establishing two secrets that are valid for accessing a resource;

configuring a client computing device to access the resource using a set of valid secrets including both of the two secrets and at least two secrets are maintained in the set of valid secrets;

receiving, from the client computing device, a first of the two secrets;

granting access to the resource based on authentication of the first of the two secrets;

revoking the first of the two secrets as valid for accessing the resource;

subsequently continuing to maintain at least two secrets in the set of valid secrets;

receiving, from the client computing device, a second of the two secrets; and granting access to the resource based on authentication of the second of the two secrets;

wherein:

the client computing device is granted access to the resource in response to receiving any arbitrary secret included in the set of valid secrets; and each of the secrets included in the set of valid secrets are secrets of a same type for providing a single entity with a same access to the resource.

18. The computer-readable storage medium of claim 17, further comprising computer-executable instructions stored thereupon which, when executed by one or more processors of a computing device, cause the computing device to perform operations comprising:

establishing a third secret that is valid for accessing the resource; and configuring the client computing device to access the resource using both the third secret and the second of the two secrets.

19. The computer-readable storage medium of claim 17, further comprising computer-executable instructions stored thereupon which, when executed by one or more processors of a computing device, cause the computing device to perform operations comprising:

receiving, from the client computing device, a notification that the client computing device was unable to access the resource using the first of the two secrets.

20. The computer-readable storage medium of claim 17, further comprising computer-executable instructions stored thereupon which, when executed by one or more processors of a computing device, cause the computing device to perform operations comprising:

configuring the client computing device to access the resource using three or more secrets that are operable for accessing the resource.

* * * * *